United States Patent
Kärkkäinen (10) Patent No.: US 9,225,989 B2
(45) Date of Patent: *Dec. 29, 2015

(54) PROCESSING OF VIDEO IMAGE

(75) Inventor: Tuomas Kärkkäinen, Turku (FI)

(73) Assignee: GURULOGIC MICROSYSTEMS OY, Turku (FI)

(*) Notice: Subject to any disclaimer, the term of this patent is extended or adjusted under 35 U.S.C. 154(b) by 947 days.

This patent is subject to a terminal disclaimer.

(21) Appl. No.: 13/430,821

(22) Filed: Mar. 27, 2012

(65) Prior Publication Data
US 2012/0183075 A1 Jul. 19, 2012

Related U.S. Application Data (63) Continuation of application No. 11/660,037, filed as application No. PCT/FI2005/050289 on Aug. 9, 2005, now Pat. No. 8,169,547.

(30) Foreign Application Priority Data

Aug. 12, 2004 (FI) ..................................... 20045290

(51) Int. Cl.
H04N 5/14 (2006.01)
H04N 9/64 (2006.01)
(Continued)

(52) U.S. Cl.
CPC .......... *H04N 19/132* (2014.11); *H04N 19/137* (2014.11); *H04N 19/176* (2014.11); *H04N 19/186* (2014.11); *H04N 19/507* (2014.11); *H04N 19/85* (2014.11)

(58) Field of Classification Search
CPC ... H04N 19/85; H04N 19/132; H04N 19/186; H04N 19/51
See application file for complete search history.

(56) References Cited

U.S. PATENT DOCUMENTS 4,553,171 A 11/1985 Holladay et al.
4,717,957 A 1/1988 Santamaki et al.
(Continued)

FOREIGN PATENT DOCUMENTS

EP 0518464 A2 12/1992
EP 0 551 990 A1 7/1993
(Continued)

OTHER PUBLICATIONS

Hein, David et al., "Video Compression Using Conditional Replenishment and Motion Prediction," IEEE Transactions on Electromagnetic Compatibility, IEEE Service Center, New York, NY, vol. EMC-10, No. 3, Aug. 1, 1984, pp. 134-142, XP011165174.
(Continued)

*Primary Examiner* — Nhon Diep
(74) *Attorney, Agent, or Firm* — Robert P. Michael, Esq.; Carter, DeLuca, Farrell & Schmidt, LLP (57) ABSTRACT

The present invention relates to a video image processor that is configured to compare a single frame included in the received video signal with a preceding processed frame so as to detect changes. In order to enable the video being compressed in as compact a format as possible the processor is configured to detect changes by dividing the pixels of a single frame into movement blocks and to detect the movement block as changed if in said movement block there is a given number of pixels whose colour value change as compared with the corresponding pixels of the preceding processed frame exceeds a predetermined threshold, to exchange the colour values of the pixels of the unchanged movement blocks in the frame under process for predetermined values and to generate a signal that indicates the changes.

30 Claims, 3 Drawing Sheets

(51) Int. Cl.
  *H04N 19/132* (2014.01)
  *H04N 19/176* (2014.01)
  *H04N 19/137* (2014.01)
  *H04N 19/186* (2014.01)
  *H04N 19/85* (2014.01)
  *H04N 19/507* (2014.01)

(56) References Cited

U.S. PATENT DOCUMENTS

| | | | |
|---|---|---|---|
| 5,377,018 | A | 12/1994 | Rafferty |
| 5,983,251 | A | 11/1999 | Martens et al. |
| 6,049,629 | A | 4/2000 | Hirabayashi et al. |
| 6,160,848 | A | 12/2000 | Sivan et al. |
| 6,275,527 | B1 | 8/2001 | Bist et al. |
| 6,373,890 | B1 | 4/2002 | Freeman |
| 7,865,015 | B2 * | 1/2011 | Chen et al. .............. 382/173 |
| 2002/0048398 | A1 | 4/2002 | Bokhour |
| 2003/0091238 | A1 | 5/2003 | Plaza |
| 2003/0165273 | A1 | 9/2003 | Berkner et al. |
| 2005/0013466 | A1 | 1/2005 | Beun |
| 2006/0013495 | A1 * | 1/2006 | Duan et al. .............. 382/235 |
| 2006/0215943 | A1 | 9/2006 | Agari et al. |
| 2007/0195993 | A1 * | 8/2007 | Chen et al. .............. 382/103 |
| 2010/0231599 | A1 | 9/2010 | Tung et al. |
| 2012/0219065 | A1 | 8/2012 | Karkkainen et al. |

FOREIGN PATENT DOCUMENTS

| | | |
|---|---|---|
| EP | 0899959 A2 | 3/1999 |
| WO | WO 86/03922 A1 | 7/1986 |
| WO | WO 01/57803 A1 | 8/2001 |

OTHER PUBLICATIONS

Zohar, Sivan et al., "Change Detector for Image Sequence Coding," Proceedings of the Picture Coding Symposium (PCS), Lausanne, Mar. 17-19, 1993, pp. 14.1A-14.1/B, XP000346481.

Zhao Y. et al., "Macroblock skip-mode prediction for complexity control of video encoders," International Conference on Visual Information Engineering, Jul. 7, 2003, pp. 5-8, XP002542234.

http://www.newmediarepublic.com/dvideo/compression/adv07.html, publ. Feb. 14, 2004 (Wayback archive), chapter, "Block Based Difference Coding".

Communication (Communication pursuant to Article 94(3) EPC) dated May 15, 2015 issued from the European Patent Office in relation to European Patent Application No. 13172237.3 (7 pages).

Written Opinion of the International Preliminary Examining Authority, International Application No. PCT/FI2014/050479 dated Jun. 24, 2015 (10 pages).

Office Action issued in U.S. Appl. No. 13/461,029 dated Aug. 11, 2015 (7 pages).

* cited by examiner

PROCESSING OF VIDEO IMAGE

CROSS REFERENCE TO RELATED APPLICATIONS

This is a Continuation of U.S. Ser. No. 11/660,037 filed Feb. 12, 2007, which is turn claims priority of PCT International Application PCT/FI2005/050289 filed Aug. 9, 2005 and Finish Application No. 20045290 filed Aug. 12, 2004, the entire contents of each of which is incorporated herein by reference.

FIELD OF THE INVENTION

The present invention relates to processing of a video image such that after compressing the video image the size of data to be stored on a storage medium, or alternatively the size of data to be further transmitted over a communications network, can be minimized.

DESCRIPTION OF THE PRIOR ART

Previously there are known video image coders, such as DivX, MPEG4 etc, which are able to compress a video image such that the file size reduces considerably compared with what the file size would be if the video image had been stored directly in the format from the video camera. For instance, the MPEG compression utilizes a solution, in which all video frames are not directly forwarded from the coder as image frames, but only in given situations a single image frame is forwarded from the coder. Frames subsequent to the image frame are not forwarded, but only the changed frame parts are retrieved and they are forwarded from the coder. In this way there will be no need to send continuously information on an unchanged background, for instance. In connection with reproduction, a single frame is displayed, whereafter change information collected from subsequent frames is utilized to change said single image frame at the same rate with the original video image. Thus, the viewer will see an almost identical video image as the one the camera originally shot.

The coders utilizing the above-described known compression algorithms have a drawback, however, that more often than necessary they interpret the video image having changed to the extent that it necessitates transmission of a whole new image frame. Frequent forwarding of a whole frame from the coder leads to a large file size, however.

For instance from WO publication 86/03922 there is also previously known a solution, in which memories of a video image transmitter and receiver maintain the same earlier shot reference image and in which, as the image changes, it is first checked whether the changed areas have changed to correspond to the respective blocks in the stored reference image. If yes, a code word is sent from the transmitter to the receiver, on the basis of which code word the receiver can retrieve from the reference image in its memory the changed movement blocks. Whereas, if the changed movement blocks do not correspond to the respective blocks in the reference image, the changed movement blocks are transmitted from the transmitter to the receiver.

The solution known from WO publication 86/03922 has a drawback, however, that it works effectively only when the background of the frame remains unchanged, in other words, in practice the camera should stay still. In addition, a solution based on code word transmission is not compatible with known coders, and consequently compression algorithms of the known coders that have been found effective cannot be utilized.

SUMMARY OF THE INVENTION

It is an object of the present invention to solve the above problems associated with the known solutions by providing a solution for processing a video image in a novel manner which enables minimization of the amount of data to be forwarded or stored and in connection of which it is possible to use coders utilizing prior art compression algorithms for video image compression. Another object of the invention is to provide a solution by which a video image processed in accordance with the invention can be reproduced. These objectives are achieved by a processor of independent claim 1, a reproduction device of independent claim 7, a method of independent claim 9, computer software of independent claim 12, a method of independent claim 13 and computer software of independent claim 15.

In the present invention it has been found that further transmission or storage of whole frames can be avoided completely when only the changed movement blocks are forwarded or stored in the original format. In order for the solution to be effectively utilized in connection with the known video coder compression algorithms the invention always forwards or stores all the movement blocks of the whole frame. The colour values of the pixels in the unchanged movement blocks are changed, however, to correspond to the values of a predetermined colour. With this procedure the prior art coders are able to compress the video image into a very compact format. Practice has shown that the obtained file size is reduced to less than a tenth of what it would be without the processing of the invention. The most considerable advantage of the solution according to the invention is thus substantial reduction in the size of a file to be stored or the amount of video data to be forwarded.

Preferred embodiments of the processor, the reproduction device and the methods of the invention are disclosed in the attached dependent claims 2 to 6, 8, 10 to 11 and 14.

BRIEF DESCRIPTION OF THE DRAWINGS

In the following the invention will be described in greater detail, by way of example, with reference to the accompanying drawings, in which.

DESCRIPTION OF THE PREFERRED EMBODIMENTS

Figure 1:
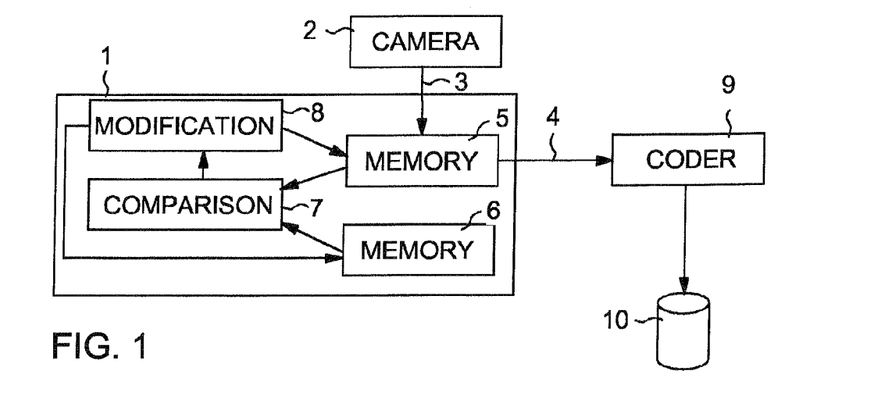
FIG. 1 is a block diagram of a first preferred embodiment of a processor in accordance with the invention.

Operations set forth in the blocks of a processor 1 of the block diagram in FIG. 1 can be implemented by software, circuit solutions or combinations thereof. Operationally the blocks can be implemented in the presented manner or alternatively the operations of one or more blocks can be integrated.

In practice the processor 1 can be integrated with the camera with which the video image is shot. This camera may be, for instance, a conventional video camera, a control camera or a mobile station with an integrated camera. It is advantageous that the processor processes video image directly from the camera, i.e. prior to storing it in a file or transmitting it further over a communications network, because in that case it will be possible to minimize the noise appearing in the image at the time of processing. This kind of noise increases the size of the file to be stored or forwarded.

In the exemplary case of FIG. 1 the processor 1 receives a video signal 3 produced by a video camera. On the basis of the processed video signal the processor 1 generates and further supplies a signal 4. The latest frame received from the camera 2, i.e. the frame under process, is stored in a memory 5. A second memory 6 stores the previous processed frame. A comparison block 7 compares the contents of the memories 5 and 6 one movement block at a time and detects the changed movement blocks on the basis of colour changes in the pixels of the movement blocks.

A modification block 8 modifies the frame under process on the basis of the comparison performed by the comparison block 7. Modification is performed on the movement blocks stored in the memory 5 which are un-changed as compared with the frame stored in the memory 6. In the modification the colour values of the unchanged movement block pixels are set to correspond to the values of a specific colour. The colour values of the pixels are advantageously set to define the pixel colour as black.

The modification block 8 also modifies the frame stored in the memory 6. This is done by copying the pixels of all changed movement blocks from the memory 5 and said pixels are stored on the corresponding movement blocks of the frame in the memory 6. Said changed frame in the memory 6 is then used as a reference frame for a subsequent frame to be received from the camera 2 so as to detect changed movement blocks.

The processor 1 utilizes the changed and unchanged movement blocks of the frame stored in the memory 5 for generating a signal 4 to be further transmitted. Said signal is supplied to a coder 9, which may be a prior art coder that compresses the received video image into a compact format (for instance MPEG4 or Div X). After the compression by the coder 9 the obtained video file is stored, for instance, on a computer hard disc 10 or another storage medium readable with an image reproduction device. Alternatively, another option is that instead of storing the obtained image file is forwarded from the coder 9 over a communications network to an image reproduction device.

In FIG. 1 the coder 9 is depicted by way of example as a separate part from the processor. Alternatively, another option is that the coder 9 is integrated with the processor, and consequently the processor and the coder can be implemented by one microcircuit, for instance.

Figure 2:
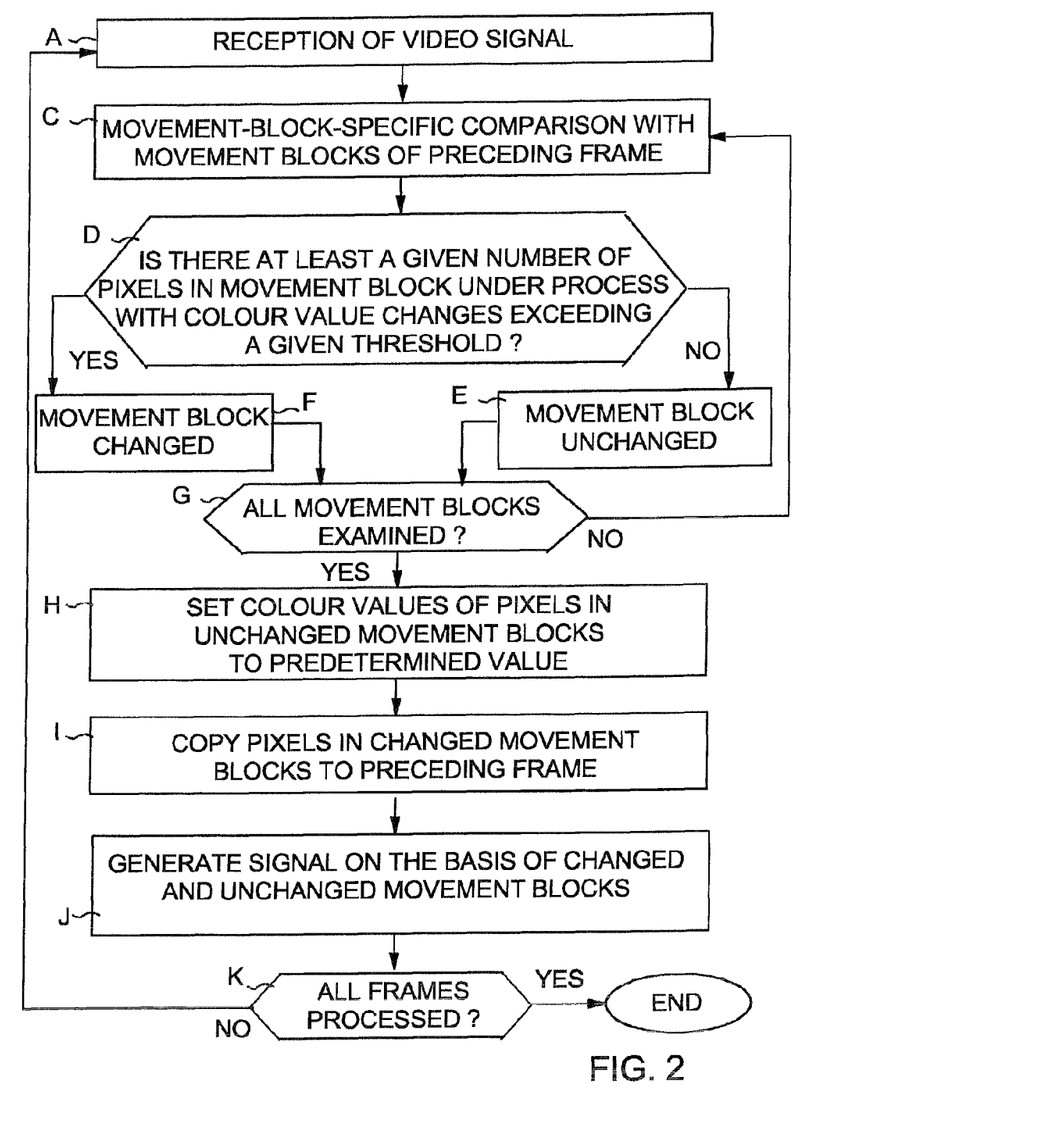
FIG. 2 is a flow chart of a first preferred embodiment of a processing method in accordance with the invention.

FIG. 2 is a flow chart of a first preferred embodiment of the processing method in accordance with the invention. FIG. 2 reveals in greater detail the operation of the processor in FIG. 1.

To initiate processing there are first performed preparatory operations. Raw video material to be captured from the camera is set un-changed in format RGB. Movement blocks are defined to be equal-sized squares having equal width (MBW) and height (MBH), i.e. 4 pixels. The size of the movement block (MBSIZE) is calculated by multiplying the width of the movement block (MBW) by its height (MBH), (MBW*MBH)=MBSIZE.

The width (FW) and the height (FH) of a video frame (FRAME) are set to be divisible by the width (MBW) and the height (MBH) of the movement block (MB). The number of fixed movement blocks (MB) is calculated by multiplying the frame width (FW) by the frame height (FH) and the product is divided by the size of the movement block (MBSIZE), i.e. (((FH*FW)=FRAMESIZE/MBSIZE)=MBCOUNT.

A matrix (MBMATRIX) is created according to the number (MBCOUNT) of the movement blocks (MB) for instance such that a frame is divided into sections (4×4) starting from the upper left corner ending to the lower right corner. For each (MBCOUNT) movement block (MB) in the frame there are calculated corner coordinates X and Y of the square, P1, P2, P3, P4, which are placed in the matrix in accordance with the order number (MBINDEX) of the movement block. The corner coordinates of the movement block are disposed as follows: P1 is the upper left corner, P2 is the upper right corner, P3 is the lower right corner and P4 is the lower left corner.

There are created a video frame buffer (FRAMEBUFFER) and a last frame buffer (LASTFRAMEBUFFER) that are equal in size. The size to be reserved for the buffers (FRAMEBUFFERSIZE, LASTFRAMEBUFFERSIZE) is calculated by multiplying the frame width (FW), the frame height (FH) and the colour depth (COLORDEPTH) in bytes, i.e. (FH*FW*COLORDEPTH)=FRAMEBUFFERSIZE=LASTFRAMEBUFFERSIZE.

For pixel changes there is created a common colour sensitivity value (COLORSENSITIVITY), which defines the pixel change. The higher the value, the greater the colour change in the compared pixels must be in order for the current pixel to be found changed.

A common trigger value (MBTRIGGERVALUE) is created for the changes in the movement blocks, which value defines a change in the movement block. The higher the value, the larger number of pixels must change, in order for the current movement block to have changed.

A counter value of changed pixels (CHANGECOUNTER) is created, which value indicates the number of changed pixels in the current movement block.

A list (CHANGEDLIST) on changed movement blocks is created, which list indicates an index of the changed movement blocks.

After these preparatory operations reception of a video signal from a camera starts in block A. The video image arriving from the camera or camera module is copied in the FRAMEBUFFER memory. The last frame buffer (LASTFRAMEBUFFER) memory is zeroed, if it has not been used at all. To zero the memory denotes that the value of each byte is set to zero. The list on the changed movement blocks (CHANGEDLIST) is reset. The value of the colour sensitivity of the movement block (COLORSENSITIVITY) is set, for instance, to have a value within the range of 4096 to 8192. The value can be set more sensitive (e.g. 2048 to 4096) if the target of the image is in the dark, or correspondingly, higher (e.g. 8192 to 16384) if the target is better lit than normal. The trigger value of a change in the movement blocks (MBTRIGGERVALUE) is set to be 4 to 8, for instance. The value can also be set lower (e.g. 2 to 4) if the target is more remote, or higher (e.g. 8 to 16) if there is a lot of noise or interference in the target.

Block C starts movement-block-specific comparison with the corresponding movement blocks in the preceding frame. Operations of blocks D to G are performed on each movement block.

Block D finds out whether the current movement block includes at least a given number of pixels whose colour value change exceed a predetermined threshold. This can be carried out in the following manner:

First the counter of changes in the movement block pixels (CHANGECOUNTER) is set to zero. A sub-loop is created where each (MBSIZE) pixel of the movement block (MB) to be processed (MBINDEX) is examined in accordance with the matrix (MBMATRIX) starting from the coordinates P1 through to the coordinates P4, however in square-shape form not to go over the coordinates P2, nor to go under the coordinates P3. The following operations are performed on each pixel:

RGB values of pixels indicated by the coordinates are picked up from the frame under process (FRAMEBUFFER) and the preceding frame (LASTFRAMEBUFFER).

RG values (PIXELRG) of a pixel in the frame under process (FRAMEBUFFER) are compared with the RG values (LASTPIXELRG) of the pixel in the preceding frame (LASTFRAMEBUFFER) so as to obtain a change in the absolute value of colour components red (RED) and green (GREEN), i.e. an absolute (ABS) change (ABSRGDIFFERENCE). Counting is performed such that the difference between the RG values of pixels in the frame under process (FRAMEBUFFER) and the preceding frame (LASTFRAMEBUFFER) is placed in an ABS function, i.e. ABS(PIXELRG−LASTPIXELRG)=ABSRGDIFFERENCE. If the absolute change (ABSRGDIFFERENCE) in the colour components red (RED) and green (GREEN) is greater than colour sensitivity (COLORSENSITIVITY) of the movement blocks, the value of the pixel change counter (CHANGECOUNTER) is raised by one.

If the change in pixels was not detected in the colour components red (RED) and green (GREEN), then the colour components of green (GREEN) and blue (BLUE) are compared in the same manner as described above for the RG values. The GB values (PIXELGB) of the pixel in the frame under process (FRAMEBUFFER) are in that case compared with the GB values (LASTPIXELGB) of the pixel in the preceding frame (LASTFRAMEBUFFER) so as to obtain an absolute (ABS) change (ABSGBDIFFERENCE) in the colour components green (GREEN) and blue (BLUE). Counting is performed such that the difference between the GB values of pixels in the frame under process (FRAMEBUFFER) and the preceding frame (LASTFRAMEBUFFER) are placed in an ABS function, i.e. ABS(PIXELGB−LASTPIXELGB)=ABSGBDIFFERENCE. If the absolute change (ABSGBDIFFERENCE) in the colour components green (GREEN) and blue (BLUE) is greater than colour sensitivity (COLORSENSITIVITY) of the movement blocks, the value of the pixel change counter (CHANGECOUNTER) is raised by one.

When all pixels in the movement block have been examined in the above manner, the pixel change counter is checked. If the value of the pixel change counter (CHANGECOUNTER) is higher than the trigger value of a movement block change (MBTRIGGERVALUE), the movement block is detected changed, whereby the process proceeds to block F, where a movement block index (MBINDEX) is set on a list of changed items (CHANGEDLIST). Whereas, if the value of the pixel change counter is lower than the trigger of the movement block change, the predetermined threshold was not exceeded, whereby the movement block is detected unchanged and the process proceeds to block E.

In block G it is checked whether all the movement blocks of the frame to be processed have been examined. If not, the process returns to block C, from which the processing of the following movement block starts.

In block H colour values of pixels in the movement blocks detected unchanged are set to a predetermined value. In accordance with the invention it is advantageous to set the colour values to indicate the movement block pixels being black, because experiments have shown that prior art compression algorithms of a video image are then capable of processing these movement blocks quickly, and additionally, the file size of the produced compressed video image is small. However, it is possible to set the colour values to correspond to another colour that enables achievement of corresponding advantages with the compression algorithm used.

The setting of colour values can be implemented, for instance, by creating a loop, in which all changed movement blocks (CHANGEDLIST) are examined. In the loop there are examined the movement blocks that do not appear on the list of changed items (CHANGEDLIST). Each pixel of these unchanged movement blocks are set black in the frame buffer (FRAMEBUFFER).

In block I the pixels of the changed movement blocks are copied to the preceding frame in the corresponding movement blocks. This can be implemented by examining in the loop the movement blocks that appear on the list of changed items (CHANGEDLIST). Each pixel of these movement blocks is copied unchanged to the same location in the preceding frame buffer (LASTFRAMEBUFFER).

In block J a signal is generated on the basis of the information (FRAMEBUFFER) on the changed and unchanged movement blocks. The signal thus conveys a preprocessed image that can subsequently be compressed by means of a compression algorithm.

In block K it is monitored whether more video data is arriving from the camera. In the affirmative, the process returns to block A, from which the processing of a new received frame stalls.

Unlike in the flow chart of FIG. 2, after detecting a specific movement block changed it is possible, in connection with block F, to record the movement blocks (8 blocks) surrounding said changed movement block as changed as well, for instance, by adding them to the list of changed items (CHANGEDLIST). Experiments have shown that in some cases there may occur interference in a reproduced video image in these surrounding movement blocks.

Figure 3:
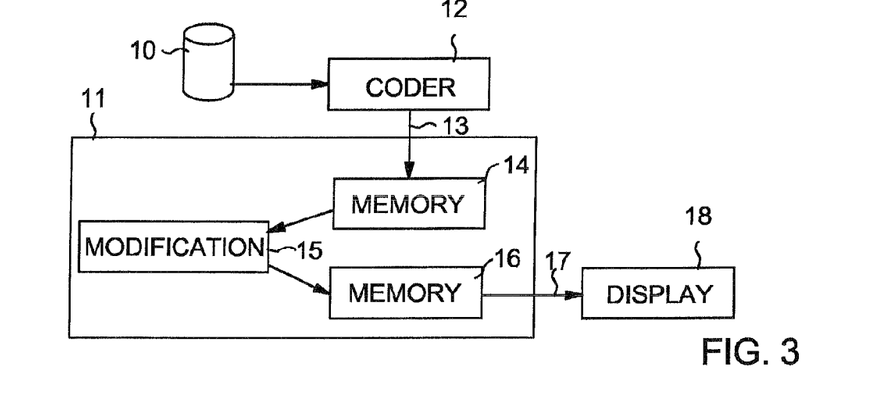
FIG. 3 is a block diagram of a first preferred embodiment of a reproduction device in accordance with the invention.

FIG. 3 is a block diagram of a first preferred embodiment of a reproduction device in accordance with the invention. Operations set forth in the blocks of the reproduction device 11 presented in the block diagram of FIG. 3 can be implemented by computer software, circuit solutions or combinations thereof. Operationally the blocks can be implemented in the presented manner, or alternatively, the operations of one or more blocks can be integrated. In practice the reproduction device 11 may consist of a computer, a television peripheral, a mobile station or any other reproduction device which is capable of reproducing video image.

In the case of FIG. 3, it is assumed, by way of example, that compressed video data is retrieved from a hard disk 10, whereafter a decoder 12 decodes compression (e.g. MPEG 4 or DivX) and supplies to the reproduction device 11 a signal 13 containing image information. The images contained in the signal 13 are stored in a memory 14, from which the reproduction device 11 retrieves and processes them one by one.

Modification block 15 identifies from the frame stored in the memory 14 the movement blocks comprising at least a given number of pixels whose colour values correspond with a given accuracy to those of a given colour. The modification block 15 identifies these movement blocks as unchanged movement blocks. The modification block 15 identifies all other blocks as changed movement blocks. The modification block 15 copies the pixels of the changed movement blocks from the frame in the memory 14 to the corresponding movement blocks of the preceding frame to be maintained in the memory 16. The reproduction device 11 utilizes the image produced in the memory 16 by including it in a video signal 17 to be applied to a display 18.

FIG. 3 shows, by way of example, that the hard disk 10 (or another storage medium of a video file), the decoder 12 and the display 18 are separate from the reproduction device 11. In practice, however, one or more of these parts can be integrated with the reproduction device. Moreover, it is an option that the video data to be reproduced is not stored on a storage medium at all, but it is received from a communications network from which it is supplied to the decoder 12.

Figure 4:
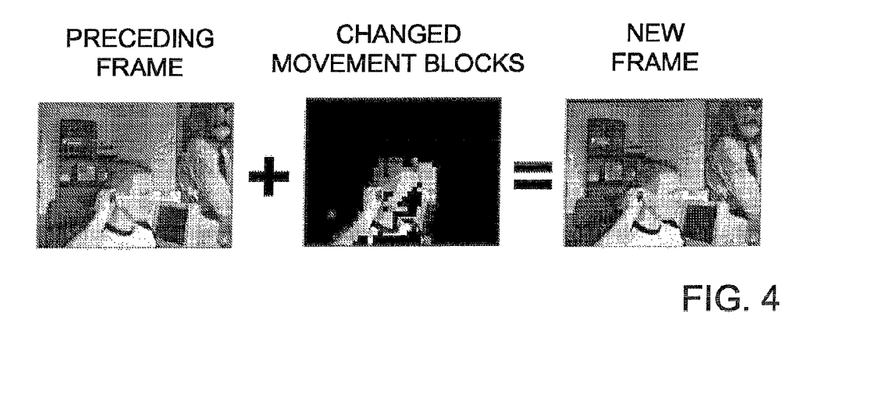
FIG. 4 illustrates production of a video image with the reproduction device.

FIG. 4 illustrates production of video image with the reproduction device. On the left in FIG. 4 there is a previous, processed and reproduced frame. In the middle there is a frame under process, where unchanged movement blocks are black, whereby only the changed movement blocks are in the original form. When the changed movement blocks of the middle frame are copied to the corresponding locations in the previous frame on the left, the result will be a new, changed frame shown on the right.

Figure 5:
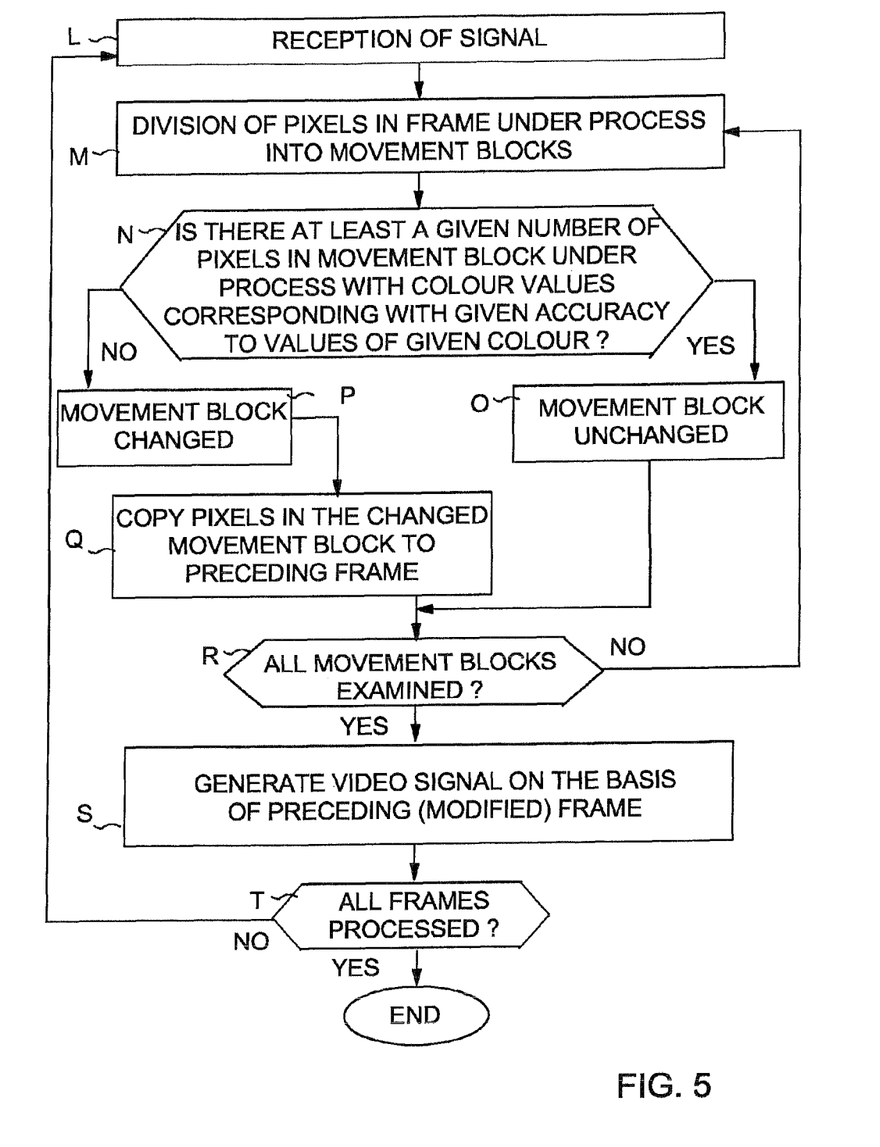
FIG. 5 is a flow chart of a first preferred embodiment of a reproduction method in accordance with the invention.

FIG. 5 is a flow chart of a first preferred embodiment of a reproduction method in accordance with the invention. At first, some preliminary operations are performed to reproduce video image.

A decoded video image is received in RGB format. The movement blocks are equal-sized squares whose width (MBW) and height (MBH) are equal, i.e. 4 pixels, for instance. The size of a movement block (MBSIZE) is calculated by multiplying the width (MBW) of the movement block by its height (MBH), (MBW*MBH)=MBSIZE. The width (FW) and the height (FH) of a frame (FRAME) are set to be divisible by the width (MBW) and the height (MBH) of the movement block. The number of fixed movement blocks (MB) is calculated by multiplying the frame width (FW) by the frame height (FH) and the product is divided by the size of the movement block (MBSIZE), i.e. (((FH*FW)=FRAMESIZE/MBSIZE)=MBCOUNT.

A matrix (MBMATRIX) is created in accordance with the number (MBCOUNT) of the movement blocks (MB) for instance such that a frame is divided in sections (4×4) starting from the upper left corner ending to the lower right corner. For each (MBCOUNT) movement block (MB) in the frame there are calculated corner coordinates X and Y of the square, P1, P2, P3, P4, which are placed in the matrix in accordance with the order number (MBINDEX) of the movement block. The corner coordinates of the movement block are disposed as follows: P1 is the upper left corner, P2 is the upper right corner, P3 is the lower right corner and P4 is the lower left corner.

There are created a video frame buffer (FRAMEBUFFER) and a buffer of a frame to be interpreted (PREFRAMEBUFFER) that are equal in size. The size to be reserved for the buffers (FRAMEBUFFERSIZE, PREFRAMEBUFFERSIZE) is calculated by multiplying the frame width (FW), the frame height (FH) and the colour depth (COLORDEPTH) in bytes, i.e. (FH*FW*COLORDEPTH) =FRAMEBUFFERSIZE=PREFRAMEBUFFERSIZE.

There is created a common trigger value (MBTRIGGERVALUE) (for instance 4), which determines a change in the movement block. The higher the value, the more pixels need to change in order for the movement block to be considered changed. There is created a counter value of changed pixels (CHANGECOUNTER), which indicates the number of changed pixels in the movement block to be processed.

Reception of the signal containing image information starts in block L. The image information contained in the received signal is stored in a memory (PREFRAMEBUFFER). The memory (FRAMEBUFFER) of a completed frame to be reproduced is zeroed, if it has not yet been used at all. To zero the memory denotes that the value of each byte is set to zero.

In block M the pixels of the frame to be examined are divided into movement blocks. So, the pixels that belong to a subsequent movement block to be examined are searched one movement block at a time.

In blocks N to O all the movement blocks of the frame are examined one by one so as to find out whether in the movement block there are at least a given number of pixels whose colour values correspond with a given accuracy to those of a given colour. In the affirmative, an unchanged movement block is in question. Otherwise a changed movement block is in question. This can be implemented such, for instance, that the following operations are performed on each movement block:

The pixel change counter (CHANGECOUNTER) of a movement block is set to zero;

A sub-loop is created in which each (MBSIZE) pixel of the movement block (MB) to be processed (MBINDEX) is examined in accordance with the matrix (MBMATRIX), starting from the coordinates P1 through to the coordinates P4, however, in square-shape form not to go over the coordinates P2, nor to go under the coordinates P3;

The pixel colour indicated by the coordinates is established from the interpreted frame (PREFRAMEBUFFER);

If the unchanged movement blocks are indicated by setting their colour values to correspond to those of black colour, then, if the value of the pixel colour (PIXELCOLOR) of the frame to be interpreted (PREFRAMEBUFFER) exceeds the black sensitivity (BLACKSENSITIVITY) value of the changing pixels (for instance 4096), the value of the pixel change counter (CHANGECOUNTER) is raised by one. (In other words, if the pixel colour is not black, the value of the pixel change counter is raised by one.);

Whereas, if the unchanged movement blocks have been indicated by setting their colour values to correspond to those of another colour, then:

If the sum of pixel colour components red (RED) and green (GREEN) differs at most for a predetermined error margin from the sum of the colour components red (RED) and green (GREEN) of a given colour, the value of the pixel change counter (CHANGECOUNTER) will be raised by one.

If the error margin was not exceeded in the comparison of the red (RED) and the green (GREEN) colour components, the green (GREEN) and the blue (BLUE) colour components are also compared. If the sum of the pixel colour components green (GREEN) and blue (BLUE) of the interpreted frame differs at most for a given error margin from the sum of the green (GREEN) and the blue (BLUE) colour components of a given colour, the value of the pixel change counter (CHANGECOUNTER) will be raised by one.

When all pixels have been examined, the value of the pixel change counter (CHANGECOUNTER) is checked. If the value exceeds the trigger value of the change in the movement block (MBTRIGGERVALUE), a changed movement block is in question, whereby the process proceeds via block P to block Q. Whereas, if the value is not higher than the change trigger value, the process proceeds via block O to block R.

In block Q the pixels of the changed movement blocks are copied to the preceding frame. This can be done by copying each pixel of the movement block under process unchanged to the same location in the frame buffer (FRAMEBUFFER).

From block R the process returns to block M to process a subsequent movement block if there are still unexamined movement blocks in the frame under process.

In block S a video signal is generated on the basis of the modified frame (FRAMEBUFFER).

If the signal reception goes on, the signal containing more frames to be interpreted, the process returns from block T to block L so as to process the image information of a subsequent frame received.

It should be understood that the above description and the relating figures are only intended to illustrate the present invention. It is obvious to the person skilled in the art that the invention may be modified and varied in a variety of ways without deviating from the scope of the claims.

The invention claimed is:

1. An image processor which is configured:
to receive a signal,
to compare an individual frame under process, included in the received signal, with a preceding processed frame so as to detect changes; and
to generate a signal which indicates changes, wherein the processor is configured:
to detect changes by dividing at least a portion of the pixels of an individual frame into movement blocks of a predetermined size and to detect a given movement block as changed if in said movement block there are at least one pixel -whose characteristic value has changed as compared with a corresponding pixel of a preceding processed frame by a predetermined threshold,
to change in the frame under process the characteristic values of all other pixels than those of the changed movement blocks by setting the characteristic values of pixels that are unchanged as compared with the preceding processed frame to predetermined values, and
to generate said signal which indicates the changes by including in said signal the information in connection with movement blocks detected as changed and also the information on unchanged movement blocks.

2. The image process of claim 1, wherein the characteristic value is a colour value.

3. A processor as claimed in claim 1, wherein if the processor detects a given movement block as changed on the basis of a characteristic value check of pixels in said movement block, the processor is configured to record also all the movement blocks surrounding said given movement block as changed.

4. A processor as claimed in claim 1, wherein the processor is configured to analyze a change in characteristic values by analyzing changes in characteristic values such that if the absolute value of a change in a first characteristic value of a single pixel exceeds said predetermined threshold, the processor finds the characteristic values of said pixel changed.

5. A processor as claimed in claims 1, wherein the processor is configured to modify said preceding processed frame by copying to it, from the frame under process, the pixels of the movement block detected as changed and to use said frame changed in this manner also in the comparison which the processor will perform on a frame subsequent to the frame under process.

6. A processor as claimed in claim 1, wherein the processor is configured to set the characteristic values of the pixels in unchanged movement blocks to predetermined values.

7. A processor as claimed in claim 6, wherein the predetermined values indicate that the pixel is black.

8. A processor as claimed in claim 1, wherein the processor is configured to feed the generated signal to an image coder operatively coupled to the processor.

9. An image processor as claimed in claim 1, wherein the image processor is a video image processor, and the received signal is a video signal.

10. An image processor as claimed in claim 1, wherein the received signal is a video signal generated by a video camera.

11. An image reproduction device which is configured:
to receive a signal containing image information, and
to generate a signal on the basis of the image information, and
to generate the signal, the reproduction device is configured:
to divide at least a portion of the pixels of a single frame to be examined in the received image information into movement blocks of a predetermined size,
to detect as unchanged the movement blocks of the examined frame in which there is at least a given number of pixels whose characteristic values correspond with a given accuracy to those of a given characteristic and to detect all other movement blocks as changed,
to modify a preceding completed frame in a memory by copying the pixels of the movement blocks detected as changed in said single examined frame to the preceding completed frame in the memory, and
to include said modified frame in the memory in the signal to be generated.

12. An image processor as claimed in claim 11, wherein the movement block is a square.

13. An image reproduction device as claimed in claim 11, wherein the reproduction device is configured to detect as unchanged the movement blocks of the examined frame in which there is at least a given number of pixels whose characteristic values have been set to predetermined values.

14. An image reproduction device as claimed in claim 13, wherein the movement blocks of the examined frame are determined as being unchanged if at least a given number of pixels indicate the pixels being black.

15. A method for processing a signal, the method comprising:
receiving a signal,
comparing a single frame included in the signal and being processed with a preceding processed frame so as to detect changes, and
generating a signal that indicates the changes,
detecting the changes by dividing the pixels in a single frame into movement blocks of a predetermined size and by detecting a given movement block as changed, if there is at least a given number of pixels whose characteristic value changes as compared with the corresponding pixels in the preceding processed frame exceeds a predetermined threshold,
changing in the frame under process the characteristic values of all other pixels than those of changed movement blocks by setting the characteristic values of the pixels in these unchanged movement blocks, as compared with the preceding processed frame, to a predetermined value, and
generating said signal that indicates the changes by including in the signal the information on the movement blocks detected as changed as well as the information on unchanged movement blocks.

16. An image reproduction device as claimed in claim 15, wherein the movement block is a square.

17. An image reproduction device as claimed in claim 15, wherein the characteristic value is a colour value.

18. A method as claimed in claim 15, wherein the method analyzes changes in characteristic values by analyzing changes in colour values and the colour values of a single pixel are detected as changed if the absolute value of a first colour value of the pixel exceeds said predetermined threshold.

19. A method as claimed in claim 18, wherein the colour values correspond to RBG values.

20. A method as claimed in claim 19, wherein the absolute value of the first colour corresponds to an absolute value of an RG value or a GB value.

21. A method as claimed in claim 15, wherein the method modifies said preceding processed frame by copying to it from the frame under process the pixels of the changed movement blocks and uses the preceding processed frame modified in this manner for the comparison to be performed on a frame subsequent to the frame under process.

22. Software for controlling a programmable device for implementing claim 15.

23. A method for generating a signal for reproduction, the method comprising:
receiving a signal containing image information with an image processor, and
generating a signal on the basis of the image information with the video image processor, wherein said method comprises:
dividing, with the video image processor, the pixels of a single frame under process in the received image information into movement blocks of a predetermined size,
detecting, with the video image processor, as unchanged the movement blocks of the frame under process in which there is at least a given number of pixels whose characteristic values correspond with a given accuracy of values of a given characteristic, and detecting all other movement blocks as changed,
modifying the preceding completed frame in a memory by copying the pixels of the movement blocks detected as changed in said single frame under process to the preceding completed single frame in the memory, and
including said modified frame in the memory in the video signal to be generated.

24. A method as claimed in claim 23, further comprising detecting as unchanged the movement blocks of the frame under process in which there are at least a given number of pixels whose characteristic values with a given accuracy indicate the pixel having predetermined value.

25. A method as claimed in claim 23, wherein the characteristic value is a colour value.

26. A method as claimed in claim 25, wherein the colour value corresponds to an RGB value.

27. A method as claimed in claim 23, wherein the image processor is a video image processor.

28. A method as claimed in claim 23, wherein the generated signal is a video signal.

29. A method as claimed in claim 23, wherein the movement block is a square.

30. Software for controlling a programmable device for implementing claim 23.

* * * * *